United States Patent
Chen et al.

(10) Patent No.: US 10,477,256 B2
(45) Date of Patent: Nov. 12, 2019

(54) METHOD FOR PROVIDING INTERACTIVE SERVICES

(75) Inventors: Jianfeng Chen, Beijing (CN); Xiaojun Ma, Beijing (CN)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 0 days.

(21) Appl. No.: 14/345,356

(22) PCT Filed: Sep. 22, 2011

(86) PCT No.: PCT/CN2011/080055
§ 371 (c)(1),
(2), (4) Date: Mar. 17, 2014

(87) PCT Pub. No.: WO2013/040783
PCT Pub. Date: Mar. 28, 2013

(65) Prior Publication Data
US 2014/0359686 A1 Dec. 4, 2014

(51) Int. Cl.
*H04N 21/47* (2011.01)
*H04N 21/239* (2011.01)
(Continued)

(52) U.S. Cl.
CPC ... *H04N 21/2393* (2013.01); *H04N 21/25866* (2013.01); *H04N 21/437* (2013.01);
(Continued)

(58) Field of Classification Search
CPC .......... H04N 21/4758; H04N 21/8545; H04N 21/2543; H04N 21/44213; H04N 21/6547; H04N 5/44591; H04N 7/17318; H04N 21/2393; H04N 21/6543; H04N 21/25891; H04N 21/23614; H04N 21/4532;
(Continued)

(56) References Cited

U.S. PATENT DOCUMENTS 8,601,502 B2 * 12/2013 Higgins ................ H04H 20/38
715/201
2002/0124247 A1 * 9/2002 Houghton .......... H04N 5/44543
725/9
(Continued)

FOREIGN PATENT DOCUMENTS

| CN | 1647550 | 7/2005 |
| CN | 1647553 | 7/2005 |

(Continued)

*Primary Examiner* — Pankaj Kumar
*Assistant Examiner* — Alazar Tilahun
(74) *Attorney, Agent, or Firm* — Brian J. Dorini; Patricia A. Verlangieri

(57) ABSTRACT

It is provided a method for providing an interactive service. At the side of a device among a plurality of devices, each being assigned one of two types, the method comprises the steps of receiving a first request associated with the interactive service requesting for responses associated with the interactive service, wherein the first request includes conditional information associated with the devices; and in response to an input from a user, if said device is of a first type, sending the response; and if said device is of a second type, sending the response only if the device meets the conditional information included in the first request.

8 Claims, 4 Drawing Sheets

(51) Int. Cl.

| | | |
|---|---|---|
| *H04N 21/40* | (2011.01) | |
| *H04N 21/475* | (2011.01) | |
| *H04N 21/258* | (2011.01) | |
| *H04N 21/437* | (2011.01) | |
| *H04N 21/45* | (2011.01) | |
| *H04N 21/478* | (2011.01) | |
| *H04N 21/643* | (2011.01) | |
| *H04N 21/647* | (2011.01) | |

(52) U.S. Cl.
CPC ....... *H04N 21/4508* (2013.01); *H04N 21/478* (2013.01); *H04N 21/4758* (2013.01); *H04N 21/64322* (2013.01); *H04N 21/64738* (2013.01)

(58) Field of Classification Search
CPC ....... H04N 21/25866; H04N 21/64738; H04N 21/64322; H04N 21/478; H04N 21/4508; H04N 21/437
USPC .................................. 725/86–104, 135–142
See application file for complete search history.

(56) References Cited

U.S. PATENT DOCUMENTS

| | | |
|---|---|---|
| 2002/0199183 A1 | 12/2002 | Taniguchi |
| 2003/0149616 A1* | 8/2003 | Travaille ................ G07C 13/00 705/12 |
| 2004/0198279 A1 | 10/2004 | Anttila et al. |
| 2005/0075919 A1 | 4/2005 | Kim |
| 2006/0184977 A1 | 8/2006 | Mueller et al. |
| 2007/0100699 A1 | 5/2007 | Ajizadeh |
| 2007/0169148 A1 | 7/2007 | Oddo et al. |
| 2008/0061142 A1* | 3/2008 | Howcroft ........... H04N 5/44591 235/386 |
| 2008/0086742 A1* | 4/2008 | Aldrey ................... H04H 60/33 725/24 |
| 2011/0113439 A1 | 5/2011 | Delegue |
| 2012/0159528 A1* | 6/2012 | Toney, Jr. .............. H04H 60/33 725/14 |
| 2013/0111514 A1* | 5/2013 | Slavin .................... H04H 60/64 725/18 |

FOREIGN PATENT DOCUMENTS

| | | |
|---|---|---|
| CN | 1792051 | 6/2006 |
| CN | 101072198 | 11/2007 |
| CN | 101212645 | 7/2008 |
| CN | 101442665 | 5/2009 |
| CN | 101662663 | 3/2010 |
| CN | 101742246 | 6/2010 |
| JP | 2003085075 | 3/2000 |
| JP | 2005523663 | 8/2005 |
| KR | 1020020015880 | 3/2002 |
| WO | WO03090482 | 10/2003 |
| WO | WO2003090484 | 10/2003 |
| WO | WO2004084444 | 9/2004 |
| WO | WO2005091717 | 10/2005 |
| WO | WO2009136047 | 11/2009 |

\* cited by examiner

| Syntax | No. of bits | Identifier |
|---|---|---|
| PES_data_field(){ | | |
|    data_identifier | 8 | uimsbf |
|    for(i=0;i<N;i++){ | | |
|      data_unit_id | 8 | uimsbf |
|      data_unit_length | 8 | uimsbf |
|      data_field() | | |
|    } | | |
| } | | |

Fig. 5

METHOD FOR PROVIDING INTERACTIVE SERVICES

This application claims the benefit, under 35 U.S.C. § 365 of International Application PCT/CN2011/080055, filed Sep. 22, 2011, which was published in accordance with PCT Article 21(2) on Mar. 28, 2013 in English.

TECHNICAL FIELD

The present invention relates to data communication, and more particularly, relates to a method for providing interactive services.

BACKGROUND

The deployment of IPTV systems and triple play applications boosts the interactive services in the digital home. One of the key benefits for interactive television viewers is to provide them with broadcast programs with real-time voting. For example, in an interactive program, such as a reality show, a song or dance contest, viewers are encouraged to send feedback or responses to the program by the following means: e-mail, web voting, short message service via mobile terminals, telephone voting; thus the interest and support rate for candidate actors/competitors can be calculated. Furthermore, in some other types of interactive programs such as quiz events, talk shows, even some news programs, the viewers are also afforded the possibility of entering their answers and selections representative of their comments. Normally, there exist two methods to implement interactive voting.

The first one is to provide supplementary information associated with interaction operations, e.g. by displaying a web site address or a telephone number. The participant viewers use additional devices such as telephones, mobile telephones or PCs to send feedback. The shortcomings of this method lie in the following aspects:

a) Additional network resources and a voting platform are required to work with the television program; and b) The voting behavior of viewers is spontaneous and generally unpredictable. There is no traffic control and congestion control for a mass of feedback sent by viewers in a short period of time; and The second one is to transmit feedback through a set-top-box connecting to the television, as long as a return channel is available in the IPTV system. The supplementary information can be displayed by the television as an alternative to the program schedule, or it can be superimposed on the current program, or else it can be represented on a second screen such as a tablet or a notebook that has an IP connection with the receiver (e.g. a Set Top Box or 'STB'). Although the second method can solve problems a) listed above. The problem b) is hard to solve because in the described voting mechanism, the voting requests are broadcasted with the TV program and there is no traffic control at the terminal side. For those popular programs with a large number of viewers, such as the Spring Festival Gala by China Central Television, which usually catches the attention of millions of viewers and assuming 10% of viewers are willing to make real-time voting for a song or dance program in a 5-minute interval, the amount of response messages is remarkable and can possibly generate congestion and service interruption in an interactive server.

SUMMARY

This present invention aims to avoid the congestion problem caused by a mass of interactive voting responses or messages sent to an interactive server in a short interval. Moreover, processing a mass of responses in a short interval may cause heavy traffic load, and consequently lead to message loss in the network interface and to large latency in the reaction to the viewers. The problem is solved by technical improvements in both the interactive server and the terminal, i.e. the STB in the example described below.

According to an aspect of present invention, it is provided a method for providing an interactive service. At the side of a device among a plurality of devices, each being assigned one of two types, the method comprises the steps of receiving a first request associated with the interactive service requesting for responses associated with the interactive service, wherein the first request includes conditional information associated with the devices; and in response to an input from a user, if said device is of a first type, sending the response; and if said device is of a second type, sending the response only if the device meets the conditional information included in the first request.

According to another aspect of present invention, it is provided a receiver in an interactive service network. The receiver is assigned one of two types, the receiver comprises a receiving module for receiving a first request associated with an interactive service requesting for responses associated with the interactive service, wherein, the first request includes conditional information associated with the receiver; a sending module for sending data; and a processing module for in response to an input from a user, if the receiver is of a first type, using the sending module to send the response; and if the receiver is of a second type, using the sending module to send the response only if the receiver meets the conditional information included in the first request.

According to another aspect of present invention, it is provided a method for transmitting an interactive service in a network comprising an interactive service server and at least one receiver. The method comprises, at the level of the server, the steps of sending a first request associated with the interactive requesting for responses associated with the interactive service to the at least one receiver, wherein, the first request includes conditional information associated with the interactive service; and receiving responses from one or more receivers of a first type and one or more receivers of a second type that meet the conditional information included in the first request.

More aspects and advantages of the invention will be found in the following detailed description of the present invention with accompanying drawings. It is to be understood that the following description relates to embodiments which are not limitative to the scope of the invention.

BRIEF DESCRIPTION OF THE DRAWINGS

FIG. 5 is a diagram showing an example of field definition of syntax of "teletext" in PES according to the embodiment of present invention.

DETAILED DESCRIPTION

Figures 1, 2:
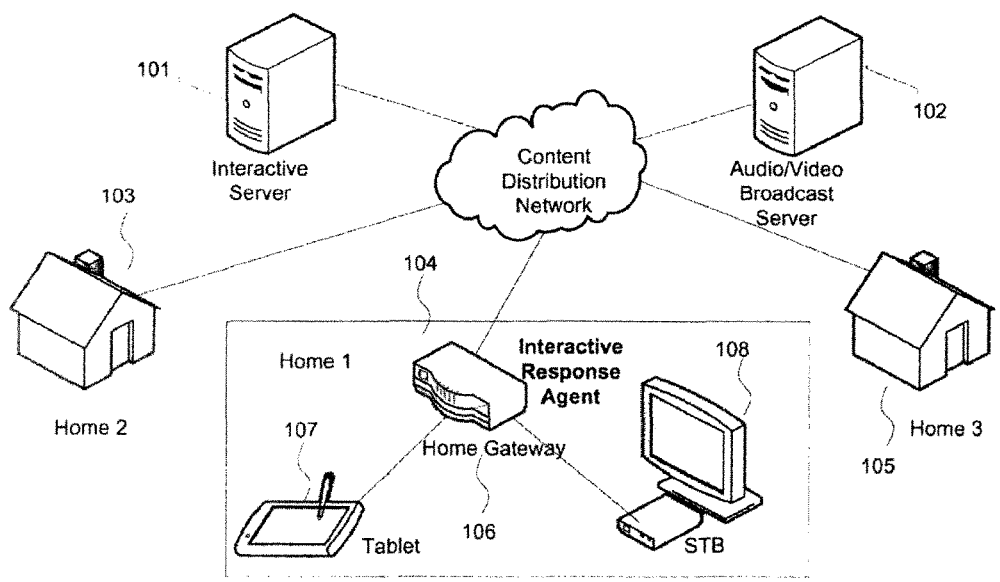
FIG. 1 is a diagram showing an example of network architecture for an interactive service in an IPTV system according to an embodiment of present invention.
FIG. 2 is a diagram showing two examples related to the content of interactive services according to the embodiment of present invention.

An embodiment of the present invention will now be described in detail in conjunction with the drawings. In the following description, some detailed descriptions of known functions and configurations may be omitted for clarity and conciseness.

Firstly, the interactive server periodically broadcasts the request (e.g. requesting for voting/score/remark/comment) to all terminals (e.g. STBs), and the request identifies a preferred group of terminals for providing a voting response (e.g. based on the last digit of the terminal's or smart card's ID number, location information stored in the terminal, etc.).

Secondly, when a terminal receives the request, it firstly determines the type of terminal, e.g. by analyzing viewer behavior information (or the use of the terminals made by the viewers) stored in the terminal. Herein, the viewers are person operating the terminals, and they are classified into two categories, i.e. passive viewer and active viewer, based on their behavior. Besides, if the terminal is capable of providing a profile or a configuration file for each viewer operating this terminal, the category of the terminal depends on the behavior of current viewer, whose information is stored in his profile or configuration file. And if the terminal does not identify viewers operating this terminal, all viewers operating this terminal should be deemed as one viewer from the viewpoint of this terminal. In the description below, the terminal does not indentify viewers operating it. For passive viewers whose voting record in their viewing history is below a predefined threshold value, the terminal of the passive viewer only sends its response to the interactive server when the terminal belongs to the preferred group. For an active viewer who votes many times in the previous program so as to make his voting record not less than the predefined threshold value, the terminal of the active viewer can ignore the constraint of the indication condition and it is allowed to send responses each time. Herein, the predefined threshold value can be set relatively higher so that a few percents of viewers are of active viewers, e.g. less than 10 percents of all viewers. By introducing the concept of active viewer and passive viewer, the viewers are encouraged to participate more in the interactive services. In a variant embodiment, this feature is optional and the viewers are not marked with active viewer or passive viewer.

Thirdly, for terminals (STB/Gateway) of passive viewers that do not meet current indication condition contained in the request but still get inputs from viewers, they can store viewers' responses and send the responses to the interactive server in response to another request having an indication condition which the terminals meet. In a variant embodiment, the terminals are divided into several groups each with a different indication condition; and the interactive server cycles through all groups by using these different indication conditions one after another.

The method of the embodiment can thus help reduce the number of responses received during a given time interval so as to avoid or at least reduce congestion.

FIG. 1 shows an example of network architecture for an interactive service in an IPTV system according to the embodiment of present invention. In the back end, there are two types of information server, the first one is an interactive server 101 to support the interaction with viewers who are watching TV, and the second one is an audio/video broadcast server for TV programs. In the system, any type of television information transmission is possible, for example, DVB (Digital Video Broadcasting) series, MBMS (Multimedia Broadcast/Multicast Service). In the FIG. 1, the content distribution network can be any bidirectional network, such as cable network, broadband IP network, wireless GSM/CDMA network, WiFi/WiMAX network . . . In the front end, devices inside a home 106 (devices are not shown for home2 103 and home3 105) may include, e.g. a home gateway 106 acting as interactive response agent, a tablet 107 and an STB 108. The tablet 107 and the STB 108 are connected to the content distribution network via the home gateway 106. The content of an interactive service can be displayed and executed on both screens or on a single screen of either the TV (via the STB) or the tablet 107. Two examples relating to the content of interactive services are shown in the FIG. 2. The left example illustrates a competitive game show program where candidates A and B are in the status of PK. The viewers are invited to send a response to support one of them by clicking the "Submit" button after the selection of candidate name. The right example represents a poll about "What would you like to do during your holidays?" in a talk show program. Four choices, i.e. "Stay Home", "Shopping", "Travel" and "Sports", are listed and viewers can select one or more items as their responses.

Figure 3:
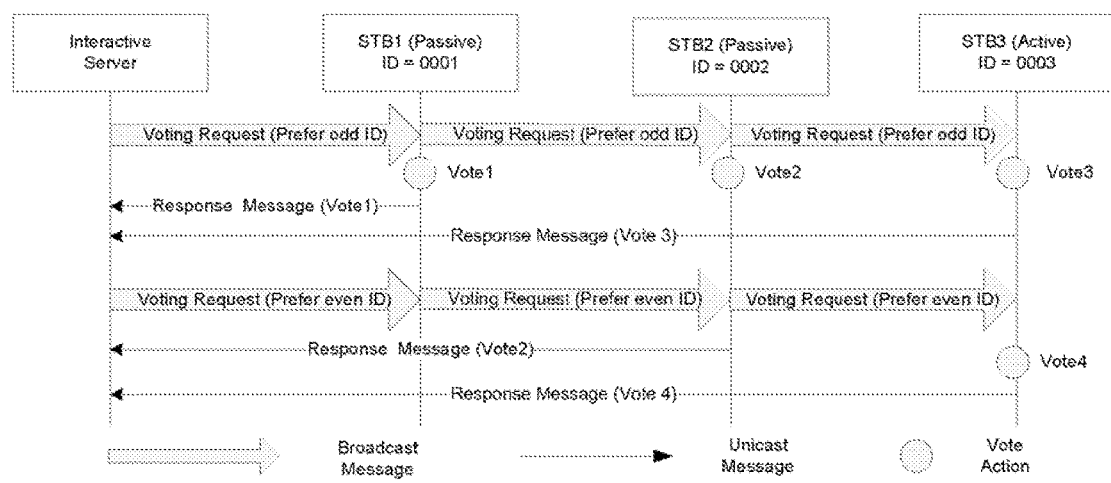
FIG. 3 is a diagram showing an example of message flow for providing interactive services according to the embodiment of present invention.

FIG. 3 shows the message flow for providing interactive services according to the embodiment of present invention. At the interactive server side, when the server broadcasts a voting request, an indication condition will be included in the request to restrict the response scale. In this embodiment, the parity of device ID is used as indication condition. As shown in the figure, the first voting request allows responses only from terminals with odd ID numbers; therefore, the STB1 (ID=0001) and STB3 (ID=0003) send back responses after viewers of the STB1 and STB3 complete their vote actions (Vote1 and Vote 3). Herein, although the viewer of STB2 (ID=0002) also makes a vote (Vote 2), the STD2 will store the response locally and send the response to the interactive server in response to a voting request collecting responses from terminals with even ID numbers. Besides, since the STB3 frequently sends votes, it is recognized as active viewer and allowed to send responses each time regardless of the limitation of indication condition. Herein, in a variant embodiment, it's possible to have a prompt on the screen showing during which period the viewer can perform the interactive action, whether or not the response has been sent to the interactive server.

According to a variant embodiment, other than a device ID, indication conditions can be based on other identifying information, such as idle time/location information (e.g. in a specific community or in a specific house etc.) etc. The idle time can refer to two aspects. One is related to a STB, which means during the idle period no response message was sent by it due to no request matched. The other is related to the viewer, which means during how much time of the idle period the viewer has not do any interaction such as voting/scoring, etc. Herein, the judgment of whether a STB is passive or active depends on statistics of viewer's behavior such as the voting rate per program or the voting rate per day. If, for example, the voting rate per program is above a predefined threshold value, e.g. 5, the STB is an active STB, or otherwise, it's a passive STB and will have to wait for the right request to send its response.

Figure 4:
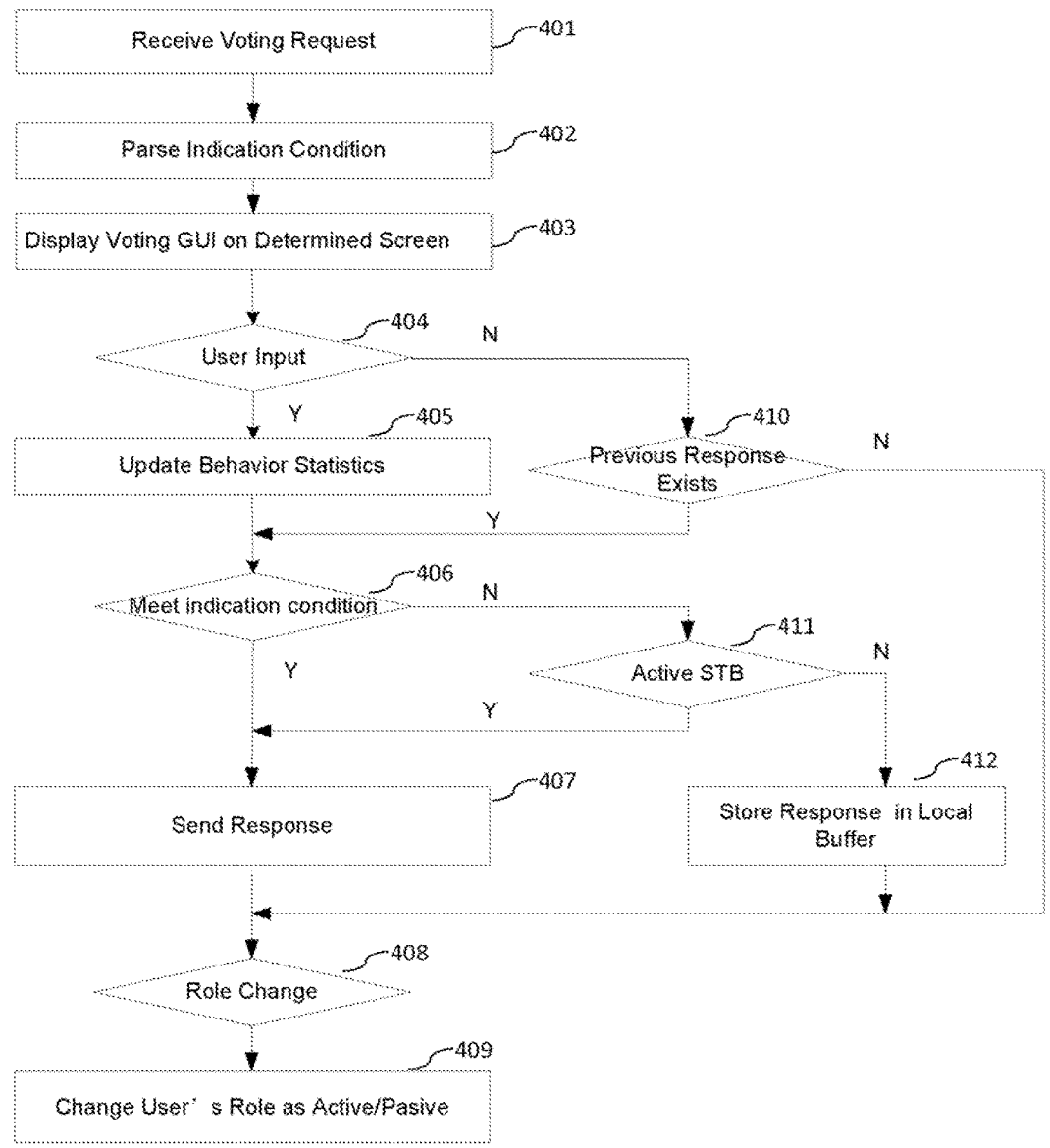
FIG. 4 is a flow chart showing a method for providing an interactive service according to the embodiment of present invention.

FIG. 4 is a flow chart showing a method for providing an interactive service according to the embodiment of present invention. As mentioned above, the content of an interactive service can be displayed and executed on both screens or a single screen of the TV or the tablet 107. A person skilled in the art can decide whether to use both screens or a single screen based on his implementation of the invention. In the embodiment described below, the content of the interactive service is displayed and executed on the tablet 107. In the step 401, the tablet receives a voting request associated with the TV program currently being displayed by the STB. The voting request includes the indication condition. As an example, the indication condition is carried in the "Teletext" field in DVB (digital video broadcast). FIG. 5 shows the field definition of syntax of "teletext" in PES (Packetized Elementary Stream), which is a component of TS (transport stream). The data_identifier is reserved and should be of a value from 0×10~0×1f; the data_unit_id is 0×02 for Teletext non-subtitle data; the data_unit_length is for the storage of the length value of the data field; and the data_ field is used to carry the indication condition. In steps 402 and 403, the tablet parses the indication condition and displays the voting GUI (graphic user interface), e.g. a GUI shown in the FIG. 2 on the tablet. In step 404, the tablet waits for receiving user input from the viewer, or in other words, it determines whether or not a user input has been received. If not, the tablet will determine if a previous response exists in step 410. The purpose of step 410 is: for some passive STBs, although viewers carry out vote actions, because the passive STBs don't meet the indication condition in the voting request, the tablets don't send the responses to the interactive server immediately but store the responses locally. So the tablet determines in step 410, for a voting request whose indication condition its corresponding passive STB meets, whether or not responses have already been made by the tablet that correspond to the passive STB. If it is determined there is no previous response in step 410, the tablet may determines whether to perform a role change for the corresponding STB in step 408 and switch between active STB and passive STB role in step 409 if needed, i.e. based on the aforementioned threshold in this example. If it is determined there is a previous response already stored in the tablet in step 410, the tablet will determine if it meets the indication condition in step 406. If it does not meet the indication condition, the tablet will further determine whether the corresponding STB is an active STB in step 411. If the corresponding STB is an active STB, the tablet will send a response to the interactive server in step 407. In one example, the response includes the ID of the corresponding STB as well as viewer's selection/comments. If the corresponding STB is not an active STB, the tablet corresponding to the passive STB will store the response in a local buffer if the response corresponds to a new user input, or still stores the response in a local buffer if the response is one made previously. If in step 404 it is determined that a user input is received, the tablet will update behavior statistics, which is stored in the tablet and will be used later in step 408 for determining if a role change is needed.

Compared to a traditional interactive service where the response will be sent back to the interactive server immediately after the viewer submits his response, the present invention provides traffic control by introducing the indication condition in the voting request. Besides, devices of viewers are classified into two types (i.e. active type and passive type as mentioned above). Switching between the two types is performed dynamically based on viewer's behavior. The devices of active type can send the responses regardless of whether the devices meet the indication condition or not, and the devices of passive type not meeting the indication condition cannot send the responses without proper request.

According to a variant, the functions implemented in the tablet for the interactive service can be integrated into the STB. In this case, the content of the interactive service, e.g. as shown in the FIG. 2, can be displayed in a specific region of the TV screen and overlapped with the TV program.

According to another variant, when a terminal receives a request from the interactive server, the terminal determines whether this request has same request content displayed to prompting the viewer to respond (e.g. shown in the FIG. 2) as a previously request to which he has already made an interaction, e.g. voting etc. If an interaction has already been made, the request content will not displayed to the viewer.

It shall note that the order of the steps in the FIG. 2 is not unique. A person skilled in the art may change the order of the steps. For example, step 411 may be put before determining if there is a previous response, i.e. step 410. For the active STBs, there is no need to determine if it meets the indication condition and if there is a previous response stored locally. For the passive STBs, it's needed to determine if it meets the indication condition, and to determine if there is a previous response when no user input is received.

According to the embodiment, it's provided a receiver or terminal in an interactive service network. The receiver is assigned one of two types. The receiver comprises at least a receiving module, a sending module, a storage module, a processing module, a statistics module etc.

The receiving module is used for receiving a first request associated with an interactive service requesting for responses associated with the interactive service, wherein, the first request includes conditional information associated with the receivers. The conditional information is used to identify which receiver(s) meets the condition. Besides, the receiving module is also used to receive inputs from viewers;

The sending module is used for sending data;

The storage module is used for store data, for example, the identification code of the receiver, the responses viewers make, the received request etc.;

The processing module is used for in response to an input from a viewer, if the receiver is of a first type (i.e. active type), using the sending module to send the response; and if the receiver is of a second type (i.e. passive type), using the sending module to send the response only if the receiver meets the conditional information included in the first request. Herein, in case that the receiver is of the second type and it still receives the input from the viewer, the receiver will store a response prepared based on the input or the input in the storage module. The stored response or input will be used later to respond to a request whose condition the receiver meets without needing any further input from the viewer.

According to the embodiment, it's provided a method for transmitting an interactive service in a network comprising an interactive service server and at least one receiver. The method comprises, at the level of the server, the steps of sending a first request associated with the interactive requesting for responses associated with the interactive service to the at least one receiver, wherein, the first request includes conditional information associated with the interactive service; and receiving responses from one or more receivers of a first type and one or more receivers of a second type that meet the conditional information included in the first request.

The invention claimed is:

1. A method, performed by a receiver device configured to receive interactive services, comprising:

determining, by the receiver device, if the receiver device is of a first type or if the receiver device is of a second type, wherein the receiver device that has determined that it is of the first type is allowed to always send a response to a request received with an interactive service, the request comprising conditional information, while the receiver device that has determined that it is of the second type is allowed to send a response to said request only when the receiver device has determined that it meets a condition indicated by said conditional information;

receiving, by the receiver device, a first request associated with the interactive service, the first request requesting for a response associated with the interactive service, the first request includes conditional information identifying a group of receiver devices; and in response to user input, when the receiver device has determined that it is of the first type, sending, by the receiver device, a response based on the user input; and when the receiver device has determined that it is of the second type, sending, by the receiver device, the response only when the receiver device has determined that it meets the condition indicated in said conditional information comprised in the first request.

2. The method according to claim 1, wherein, when the receiver device has determined that it is of the second type and the receiver device has determined that it does not meet the condition indicated in the conditional information comprised in the first request, the method further comprises storing the response in the receiver device.

3. The method according to claim 2, wherein, when the receiver device has determined that it is of the second type and the receiver device has determined that it does not meet the condition indicated by said conditional information comprised in the first request, the method further comprises:

receiving a broadcast request associated with the interactive service including second conditional information different from the conditional information comprised in the first request; and sending the stored response when the receiver device has determined that it meets the condition indicated in the second conditional information comprised in the broadcast request.

4. The method according to claim 2, wherein, when the receiver device does not receive user input responsive to receipt of the first request, the method further comprises:

determining whether a response has been stored responsive to a previous request that is the same as the first request; and sending the stored response only when the receiver device has determined that the condition indicated in the conditional information comprised in the first request is met.

5. The method according to claim 1, further comprising changing, by the receiver device, the type of the receiver device between the first type and the second type based on statistics of previous responses sent by the receiver device.

6. The method according to claim 5, wherein, the statistics of previous responses comprise an average number of responses sent by the receiver device during a program or in a day.

7. The method according to claim 6, wherein, when the average number is above a value, the receiver device is determined to be of the first type, otherwise it is of the second type.

8. The method according to claim 1, wherein the conditional information includes information about receiver device identifier, location and idle time.

* * * * *